(12) United States Patent
Park et al.

(10) Patent No.: US 11,961,013 B2
(45) Date of Patent: Apr. 16, 2024

(54) METHOD AND APPARATUS FOR ARTIFICIAL INTELLIGENCE MODEL PERSONALIZATION

(71) Applicant: SAMSUNG ELECTRONICS CO., LTD., Suwon-si (KR)

(72) Inventors: Chiyoun Park, Suwon-si (KR); Jaedeok Kim, Suwon-si (KR); Youngchul Sohn, Suwon-si (KR); Inkwon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 397 days.

(21) Appl. No.: 16/923,551

(22) Filed: Jul. 8, 2020

(65) Prior Publication Data

US 2021/0019641 A1 Jan. 21, 2021

Related U.S. Application Data

(60) Provisional application No. 62/875,758, filed on Jul. 18, 2019.

(30) Foreign Application Priority Data

Nov. 28, 2019 (KR) .................. 10-2019-0155985

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ................................ G06N 5/04; G06N 20/00
See application file for complete search history.

(56) References Cited

U.S. PATENT DOCUMENTS

| 9,275,638 | B2 | 3/2016 | Meloney et al. |
| 10,109,273 | B1 | 10/2018 | Rajasekaram et al. |
| 10,706,356 | B1* | 7/2020 | Doyle ...................... G06N 3/08 |
| 2009/0063378 | A1* | 3/2009 | Izikson ............... G03F 7/70633 |
| | | | 706/21 |

(Continued)

FOREIGN PATENT DOCUMENTS

| JP | 2019-40543 A | 3/2019 |
| KR | 10-2019-0028531 A | 3/2019 |

(Continued)

OTHER PUBLICATIONS

Wang, et al., Signature Handwriting Identification Based on Generative Adversarial Networks, J. Phys.: Conf. Ser. 1187 042047, 2019, pp. 1-5 (Year: 2019).*
Zhu, et al., Electrocardiogram generation with a bidirectional LSTM-CNN generative adversarial network, Scientific Reports, May 2019, pp. 1-11 (Year: 2019).*
Barros, et al., A Personalized Affective Memory Model for Improving Emotion Recognition, Proceedings of the 36th International Conference on Machine Learning, PMLR 97, 2019, pp. 1-10 (Year: 2019).*

(Continued)

*Primary Examiner* — George Giroux
(74) *Attorney, Agent, or Firm* — Sughrue Mion, PLLC

(57) ABSTRACT

Disclosed is an electronic apparatus. The electronic apparatus may include a memory configured to store one or more training data generation models and an artificial intelligence model, and a processor configured to generate personal training data that reflects a characteristic of a user using the one or more training data generation models, train the artificial intelligence model using the personal learning data as training data, and store the trained artificial intelligence model in the memory.

20 Claims, 9 Drawing Sheets

(56) References Cited

U.S. PATENT DOCUMENTS

| | | | |
|---|---|---|---|
| 2014/0195236 A1 | 7/2014 | Hosom et al. | |
| 2015/0242760 A1 | 8/2015 | Miao et al. | |
| 2015/0371023 A1 | 12/2015 | Chen et al. | |
| 2017/0091652 A1 | 3/2017 | Miao et al. | |
| 2017/0133006 A1 | 5/2017 | Lee et al. | |
| 2018/0018590 A1 | 1/2018 | Szeto et al. | |
| 2018/0330271 A1 | 11/2018 | Maleki et al. | |
| 2018/0357539 A1 | 12/2018 | Hwang et al. | |
| 2019/0012575 A1 | 1/2019 | Xiao et al. | |
| 2019/0012576 A1 | 1/2019 | Liu et al. | |
| 2019/0236482 A1 | 8/2019 | Desjardins et al. | |
| 2019/0287515 A1* | 9/2019 | Li | G06N 3/084 |
| 2019/0324731 A1* | 10/2019 | Zhou | G06F 8/427 |
| 2020/0265301 A1* | 8/2020 | Burger | G06N 3/084 |

FOREIGN PATENT DOCUMENTS

| | | | | |
|---|---|---|---|---|
| KR | 10-2019-0032433 A | | 3/2019 | |
| WO | WO-2016007822 A1 | * | 1/2016 | B60L 53/305 |
| WO | 2017/134519 A1 | | 8/2017 | |
| WO | 2018/017467 A1 | | 1/2018 | |

OTHER PUBLICATIONS

Helmers et al. (Generation and Use of Synthetic Training Data in Cursive Handwriting Recognition, Jan. 2003, pp. 336-345) (Year: 2003).*
Cano et al. (Training Set Expansion in Handwritten Character Recognition, Jan. 2002, pp. 1-9) (Year: 2002).*
Communication dated Mar. 10, 2022 issued by the European Patent Office in application No. 20841044.9.
Yongbin, Z., et al., "The Design and Implementation of Behavior-Driven Artificial Neural Network Computing System", IEEE Computer Society, Aug. 2009, XP031564914, pp. 150-153.
Kamra, N., et al., "Deep Generative Dual Memory Network for Continual Learning", arXiv:1710.10368v2 [cs.LG], May 25, 2018, XP081316148, 15 pages.
International Search Report (PCT/ISA/210) dated Sep. 28, 2020 by the International Searching Authority in counterpart International Patent Application No. PCT/KR2020/008937.
Written Opinion (PCT/ISA/237) dated Sep. 28, 2020 by the International Searching Authority in counterpart International Patent Application No. PCT/KR2020/008937.

* cited by examiner

FIG. 8

METHOD AND APPARATUS FOR ARTIFICIAL INTELLIGENCE MODEL PERSONALIZATION

CROSS-REFERENCE TO RELATED APPLICATION(S)

This application is based on and claims priority under 35 U.S.C. § 119 to U.S. Provisional Patent Application No. 62/875,758, filed on Jul. 18, 2019 in the United States Patent and Trademark Office, and Korean Patent Application No. 10-2019-0155985, filed on Nov. 28, 2019 in the Korean Intellectual Property Office, the disclosures of which are incorporated by reference herein in their entireties.

BACKGROUND

1. Field

The disclosure relates to an electronic apparatus that is updated based on training data and a control method thereof, and more particularly, to a method and apparatus for artificial intelligence model personalization through incremental learning.

2. Description of Related Art

An artificial neural network may be designed and trained to perform a wide range of functions, and an application technology thereof may be applied to voice recognition, object recognition, and the like. As the artificial neural network is trained by using a large amount of training data from a large database, the artificial neural network may exhibit improved performance. Particularly, in the case of an artificial intelligence model that recognizes an element that is different for each user, such as voice, a vast amount of data is required because it might be necessary to train the artificial intelligence model by using both personal training data including a characteristic of a user of an electronic apparatus and general training data including a characteristic of a general user.

Therefore, a method in which training data for updating the artificial intelligence model is continuously accumulated and the artificial intelligence model is trained based on the accumulated training data, as illustrated in FIG. 1, may be considered. However, such a method has a problem in that storage capacity needs to be continuously increased in accordance with an increase in training data, a computer resource for learning is increased, and a time required for the update of the model is increased.

Further, a method in which the artificial intelligence model is trained by sampling only some of the training data may be considered, but such a method has a problem in that it is not easy to efficiently perform the sampling.

Further, a method in which existing training data is not maintained or is partially maintained, and the artificial intelligence model is trained based on new training data has a problem of catastrophic forgetting in which the artificial intelligence model forgets previously learned knowledge.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

According to an aspect of the disclosure, an electronic apparatus may include a memory configured to store one or more training data generation models and an artificial intelligence model, and a processor configured to generate personal training data that reflects a characteristic of a user using the one or more training data generation models, train the artificial intelligence model using the personal learning data as training data, and store the trained artificial intelligence model in the memory.

The one or more training data generation models may include a personal training data generation model trained to generate the personal training data that reflects the characteristic of the user, and a general training data generation model trained to generate general training data corresponding to use data of a plurality of users.

The artificial intelligence model may be a model that is updated based on at least one of the personal training data, the general training data, or actual user data obtained from the user.

The personal training data generation model may be updated based on at least one of the user data or the personal training data.

The artificial intelligence model may be a voice recognition model, a handwriting recognition model, an object recognition model, a speaker recognition model, a word recommendation model, or a translation model.

The general training data may include first input data, the personal training data includes second input data, and the artificial intelligence model performs unsupervised learning based on the user data, the first input data, and the second input data.

The general training data may include first input data, the personal training data may include second input data, and the artificial intelligence model may generate first output data corresponding to the first input data based on the first input data being input, generates second output data corresponding to the second input data based on the second input data being input, and is trained based on the user data, the first input data, the first output data, the second input data, and the second output data.

The general training data generation model may be downloaded from a server and stored in the memory.

The processor may upload the artificial intelligence model to the server.

The processor may train the artificial intelligence model based on the electronic apparatus being in a charge state, an occurrence of a predetermined time, or detecting no manipulation of the electronic apparatus by the user for a predetermined time.

According to an aspect of the disclosure, a control method of an electronic apparatus including one or more training data generation models and an artificial intelligence model may include generating personal training data that reflects a characteristic of a user using the one or more training data generation models; training the artificial intelligence model using the personal training data as training data; and storing the trained artificial intelligence model.

The one or more training data generation models may include a personal training data generation model trained to generate the personal training data that reflects the characteristic of the user, and a general training data generation model trained to generate general training data corresponding to use data of a plurality of users.

The artificial intelligence model may be a model that is updated based on at least one of the personal training data, the general training data, or actual user data obtained from the user.

The personal training data generation model may be updated based on at least one of the user data or the personal training data.

The artificial intelligence model may be a voice recognition model, a handwriting recognition model, an object recognition model, a speaker recognition model, a word recommendation model, or a translation model.

The general training data may include first input data, the personal training data may include second input data, and the artificial intelligence model may perform unsupervised learning based on the user data, the first input data, and the second input data.

The general training data may include first input data, the personal training data may include second input data, and the artificial intelligence model may generate first output data corresponding to the first input data based on the first input data being input, may generate second output data corresponding to the second input data based on the second input data being input, and may be trained based on the user data, the first input data, the first output data, the second input data, and the second output data.

The general training data generation model may be downloaded from a server and stored in a memory of the electronic apparatus.

The artificial intelligence model may be uploaded to the server.

The method may include training the artificial intelligence model based on the electronic apparatus being in a charge state, an occurrence of a predetermined time, or detecting no manipulation of the electronic apparatus by the user for a predetermined time.

According to an aspect of the disclosure, a non-transitory computer-readable medium may store a program for performing a method for personalization of an artificial intelligence model in an electronic apparatus, the method including generating personal training data that reflects a characteristic of a user; and training the artificial intelligence model using the personal training data as training data.

The method may include generating general training data that reflects a characteristic of a plurality of users.

The method may include collecting and storing actual use data of the user obtained through a device in the electronic apparatus.

The method may include training the artificial intelligence model using at least one of the personal training data, the general training data, or the obtained actual use data of the user.

As described above, according to various embodiments of the disclosure, one or more general training data and personal training data are generated on the electronic apparatus by the training data generation models, and thus it is not necessary to store a vast amount of training data (for example, a volume of 1 to 2 TB) for training the artificial intelligence model. Therefore, it is possible to efficiently train the artificial intelligence model by using the training data generation model (for example, a model size of 10 to 20 MB) according to the present embodiment even on an electronic apparatus with a small memory capacity.

Further, because it is not necessary to download training data from an external server, the artificial intelligence model may be freely trained even in a state where a network connection is not established.

Further, the artificial intelligence model is trained based on personal training data that reflects a characteristic of the user of the electronic apparatus, and thus the artificial intelligence model may have an improved accuracy in recognition of user data such as a user voice.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a diagram for describing the case that the artificial intelligence model is implemented by an object recognition model according to another embodiment.

DETAILED DESCRIPTION

Figure 1:
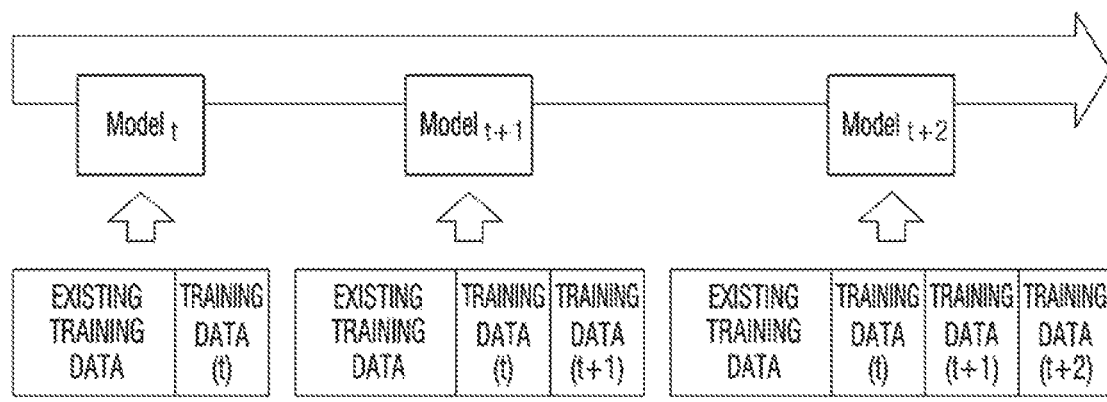
FIG. 1 is a diagram for describing related art.

Hereinafter, the disclosure will be described in detail with reference to the accompanying drawings.

After terms used in the specification are briefly described, the disclosure will be described in detail.

General terms that are currently widely used were selected as terms used in embodiments of the disclosure in consideration of functions in the disclosure, but may be changed depending on the intention of those skilled in the art or judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined based on the meaning of the terms and the content throughout the disclosure rather than simple names of the terms.

Because the disclosure may be variously modified and have several embodiments, specific embodiments of the disclosure will be illustrated in the drawings and be described in detail in the detailed description. However, it is to be understood that the disclosure is not limited to specific embodiments, but includes all modifications, equivalents, and substitutions without departing from the scope and spirit of the disclosure. In case that it is decided that a detailed description for the known art related to the disclosure may obscure the gist of the disclosure, the detailed description will be omitted.

Singular forms of terms are intended to include plural forms of the terms unless the context clearly indicates otherwise. It should be understood that terms such as "comprise" or "include" used in the present specification, specify the presence of features, numerals, steps, operations, components, parts mentioned in the present specification, or combinations thereof, but do not preclude the presence or addition of one or more other features, numerals, steps, operations, components, parts, or combinations thereof.

An expression "at least one of A and/or B" should be understood as indicating "only A," "only B," or "A and B".

Expressions such as "first", "second", or the like, used in the specification may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component).

In the disclosure, a "module" or a "-er/or" may perform at least one function or operation, and be implemented by hardware or software or be implemented by a combination of hardware and software. In addition, a plurality of "modules" or a plurality of "-ers/ors" may be integrated in at least one module and be implemented by at least one processor (not illustrated) except for a "module" or a "-er/or" that is implemented by specific hardware. In the disclosure, a term "user" may be a person that uses an electronic apparatus or an apparatus (for example, an artificial intelligence (AI) electronic apparatus) that uses an electronic apparatus.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments described herein. In addition, in the drawings, portions unrelated to the description will be omitted so as to not obscure the disclosure, and similar reference numerals will be used to describe similar portions throughout the specification.

Hereinafter, an embodiment of the disclosure will be described in detail with reference to the accompanying drawings.

Figure 2:
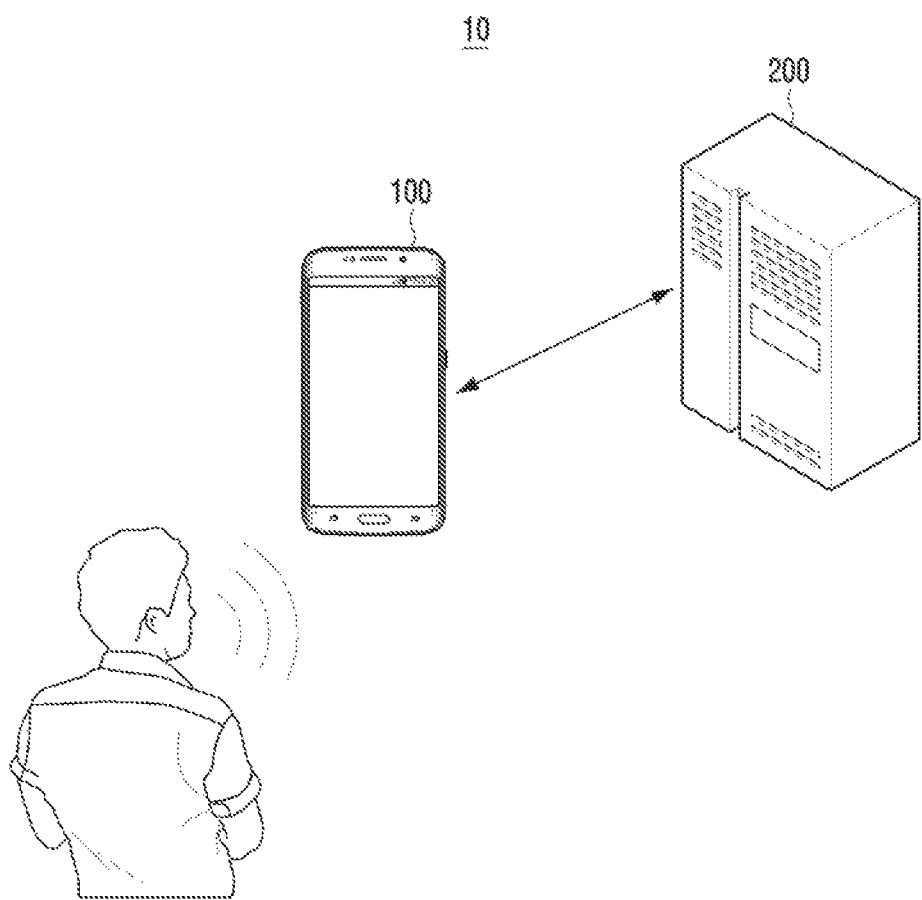
FIG. 2 is a diagram for schematically describing a configuration of an electronic system according to an embodiment.

FIG. 2 is a diagram for schematically describing a configuration of an electronic system according to an embodiment.

Referring to FIG. 2, an electronic system 10 according to an embodiment includes an electronic apparatus 100 and a server 200.

The electronic apparatus 100 according to the embodiment may be configured to recognize user data by using an artificial intelligence model (alternatively, a neural network model or a learning network model) to perform a specific operation. Here, the user data is data that reflects a unique characteristic of a user, such as a voice of the user, handwriting of the user, a captured image of the user, input character data of the user, translation data, or the like. Further, the user data is actual use data obtained from the user, and may also be referred to as actual user data.

Functions related to artificial intelligence according to the disclosure are performed by a processor and a memory. The processor may be implemented by one processor or a plurality of processors. Here, the one or plurality of processors may be a general processor such as a central processing unit (CPU), an application processor (AP), or a digital signal processor (DSP), a graphic dedicated processor such as a graphics processing unit (GPU) or a vision processing unit (VPU), or an artificial intelligence dedicated processor such as a neural processing unit (NPU). The one or plurality of processors may be configured to perform a control to process input data according to a pre-defined operation rule stored in the memory or an artificial intelligence model. Alternatively, in case that the one or plurality of processors are an artificial intelligence dedicated processor, the artificial intelligence dedicated processor may be designed to have a hardware structure specialized in processing of a specific artificial intelligence model.

The pre-defined operation rule or the artificial intelligence model is obtained through training. Here, obtaining the pre-defined operation rule or the artificial intelligence model through training means that a basic artificial intelligence model is trained using training data and by using a training algorithm to obtain the pre-defined operation rule or the artificial intelligence model set to achieve a desired characteristic (or purpose). Training may be performed by a device in which artificial intelligence is performed according to the disclosure, or may be performed through a separate server and/or system. Examples of the training algorithm may include supervised learning, unsupervised learning, semi-supervised learning, and reinforcement learning, but are not limited thereto.

The artificial intelligence model may include a plurality of neural network layers. Each of the plurality of neural network layers has a plurality of weight values, and neural network calculation is performed by using a calculation result of a previous layer and through calculation using the plurality of weight values. The plurality of weight values of the plurality of neural network layers may be optimized (or improved) by a training result of the artificial intelligence model. For example, the plurality of weight values may be updated to decrease or minimize a loss value or cost value acquired by the artificial intelligence model during the training process. An artificial neural network may include a deep neural network (DNN). For example, the artificial neural network may be a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

In a case that the artificial intelligence model is a voice recognition model according to an embodiment, the electronic apparatus 100 may include a voice recognition model that recognizes voice of the user, and may thus provide a virtual assistant function. For example, the electronic apparatus 100 may be implemented in various forms such as a smartphone, a tablet personal computer (PC), a mobile phone, a videophone, an e-book reader, a desktop PC, a laptop PC, a netbook computer, a workstation, a server, a personal digital assistant (PDA), a portable multimedia player (PMP), an MP3 player, a medical device, a camera, and a wearable device.

The artificial intelligence model may include a plurality of neural network layers, and may be trained to increase recognition efficiency.

The electronic apparatus 100 according to the embodiment may include training data generation models that generate training data by themselves without retaining a vast amount of training data for training the artificial intelligence model, and thus the artificial intelligence model may be updated in real time as needed.

The training data generation models may be installed in the electronic apparatus in advance or may be downloaded from the server 200 and installed in the electronic apparatus.

The artificial intelligence model may be trained based on training data generated by the training data generation models installed in the electronic apparatus as described above.

Here, the training data generation models may include at least one personal training data generation model and a general training data generation model. The personal training data generation model may be a model that generates personal training data for reflecting a characteristic of the user of the electronic apparatus 100, and the general training data generation model may be a model that generates general training data for reflecting a characteristic of a general user.

The artificial intelligence model may be trained by using the personal training data generated from the personal training data generation model, the general training data generated from the general training data generation model, or both of the personal training data and the general training data.

The artificial intelligence model may be trained by using both of the personal training data and the general training data, because the characteristic of the user of the electronic apparatus 100 may not be reflected in a case that the artificial intelligence model is trained only by using the general training data, and the training of the artificial intelligence model may be performed while being excessively skewed toward a characteristic of a specific user in a case that the artificial intelligence model is trained only by using the personal training data.

The server 200 is an apparatus that is configured to manage at least one of the personal training data generation model, the general training data generation model, or the artificial intelligence model, and may be implemented by a central server, a cloud server, or the like. The server 200 may transmit at least one of the personal training data generation model, the general training data generation model, or the artificial intelligence model to the electronic apparatus 100 based on a request from the electronic apparatus 100, or the like. Particularly, the server 200 may transmit, to the electronic apparatus 100, a general training data generation model that is pre-trained based on general user data. Further, the server 200 may transmit, to the electronic apparatus 100, update information (for example, weight value information of each layer or bias information) for updating the general training data generation model that is already trained, or the updated general training data generation model itself, as needed.

The personal training data generation model and the artificial intelligence model transmitted to the electronic apparatus 100 may be models that are untrained. The personal training data generation model and the artificial intelligence model may be installed in the electronic apparatus in advance. The personal training data generation model and the artificial intelligence model of the electronic apparatus may be trained on the electronic apparatus 100 without a process of transmitting training-related user data to the server, in consideration of user privacy or the like. In some cases, the user data may be transmitted to the server 200 and the personal training data generation model and the artificial intelligence model may be trained on the server 200.

The training data generation models may directly generate training data in the electronic apparatus 100, and thus the electronic apparatus 100 might not be required to store a vast amount of actual training data, or separately receive training data from the server 200. Further, the artificial intelligence model may also be trained by using the personal training data, in addition to the general training data. Therefore, the artificial intelligence model may be trained to be a personalized artificial intelligence model that reflects a characteristic of the user and may be updated incrementally.

The artificial intelligence model may be implemented by various models such as a handwriting recognition model, a visual object recognition model, a speaker recognition model, a word recommendation model, and a translation model, in addition to the voice recognition model. However, hereinafter, the voice recognition model will be mainly described for convenience of explanation.

Figure 3:
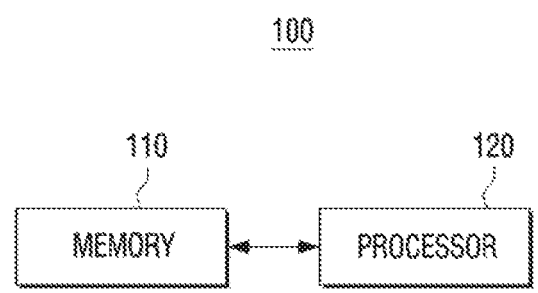
FIG. 3 is a block diagram for describing an operation of an electronic apparatus according to an embodiment.

FIG. 3 is a block diagram for describing an operation of the electronic apparatus according to an embodiment of the disclosure.

Referring to FIG. 3, the electronic apparatus 100 includes a memory 110 and a processor 120.

The memory 110 is electrically connected to the processor 120, and may store data for implementing various embodiments of the disclosure.

The memory 110 may be implemented in a form of a memory embedded in the electronic apparatus 100 or in a form of a memory attachable to and detachable from the electronic apparatus 100, depending on a data storing purpose. For example, data for driving the electronic apparatus 100 may be stored in the memory embedded in the electronic apparatus 100, and data for an extension function of the electronic apparatus 100 may be stored in the memory attachable to and detachable from the electronic apparatus 100. The memory embedded in the electronic apparatus 100 may be implemented by at least one of a volatile memory (for example, a dynamic RAM (DRAM), a static RAM (SRAM), or a synchronous dynamic RAM (SDRAM)), a non-volatile memory (for example, a one time programmable ROM (OTPROM), a programmable ROM (PROM), an erasable and programmable ROM (EPROM), an electrically erasable and programmable ROM (EEPROM), a mask ROM, a flash ROM, a flash memory (for example, a NAND flash or a NOR flash), a hard drive, or a solid state drive (SSD), and the memory attachable to and detachable from the electronic apparatus 100 may be implemented by a memory card (for example, a compact flash (CF), a secure digital (SD), a micro secure digital (Micro-SD), a mini secure digital (Mini-SD), an extreme digital (xD), a multimedia card (MMC)), an external memory (for example, a USB memory) connectable to the USB port, or the like.

According to an embodiment, the memory 110 may store one or more training data generation models and the artificial intelligence model. Here, the one or more training data generation models may include the general training data generation model and the personal training data generation model.

Here, the general training data generation model may be a model trained to generate the general training data corresponding to use data of general users. In other words, the general training data may be data that reflects a characteristic of a general user. According to an embodiment, the general training data generation model includes a plurality of neural network layers, each of the plurality of neural network layers includes a plurality of parameters, and each layer may perform neural network calculation by using a calculation result of a previous layer and through calculation using the plurality of parameters. For example, calculation is sequentially performed in a plurality of pre-trained neural network layers included in the general training data generation model based on a random value being input, such that the general training data may be generated.

The personal training data generation model is a model trained to generate personal training data that reflects a characteristic of the user of the electronic apparatus 100. For example, calculation is sequentially performed in a plurality of pre-trained neural network layers included in the personal training data generation model based on a random value being input, such that the personal training data may be generated.

According to an embodiment, the artificial intelligence model may be a model that recognizes data resulting from a user operation, such as a voice utterance or handwriting. The artificial intelligence model may be a voice recognition model, a handwriting recognition model, an object recognition model, a speaker recognition model, a word recommendation model, a translation model, or the like. As an example, in case that the artificial intelligence model is implemented by the voice recognition model, the artificial intelligence model may be implemented by an automatic voice recognition (ASR) model which is a model that recognizes a voice of the user and outputs a text corresponding the recognized voice. However, according to another embodiment, the artificial intelligence model may be a model that generates various outputs based on a user voice, for example, outputs a transformed voice corresponding to the user voice. As long as the artificial intelligence model may be trained by using the personal training data to reflect a personal characteristic, the artificial intelligence model may be implemented by various types of models, in addition to the above-described models.

The personal training data generation model and the artificial intelligence model may be received from the server 200 and stored in the memory 110. However, the personal training data generation model and the artificial intelligence model may also be stored in the memory 110 at the time of manufacturing the electronic apparatus 100 or received from another external apparatus other than the server and stored in the memory 110.

Further, the memory 110 may store user data. Here, the user data are actual user data of the user. For example, the user data may be voice data directly uttered by the user, handwriting actually written by the user, an image directly captured by the user, or the like. The user data have a concept different from that of the personal training data or the general training data. As an example, the user data may be voice data directly uttered by the user, and the personal training data may be data of a voice similar to the voice directly uttered by the user, the similar voice being artificially generated by the personal training data generation model for training of the artificial intelligence model.

As an example, in a case that the user data is user voice data, the user voice data may be user voice data received through a microphone (not illustrated) provided in the electronic apparatus 100 or user voice data received from an external apparatus. For example, the user voice data may be, but not limited to, data such as a WAV file or an MP3 file.

As another example, in case that the user data is user handwriting data, the user handwriting data may be handwriting data input with a touch by the user or a stylus pen through a display (not illustrated) provided in the electronic apparatus 100.

The user data may be stored in a memory different from that in which the general training data generation model, the personal training data generation model, and the artificial intelligence model are stored.

The processor 120 is electrically connected to the memory 110 and controls an overall operation of the electronic apparatus 100. The processor 120 controls the overall operation of the electronic apparatus 100 by using various instructions or programs stored in the memory 110. Particularly, according to an embodiment, a main central processing unit (CPU) may copy a program according to an instruction stored in a ROM to a RAM, and access the RAM to execute the program. Here, the program may include the artificial intelligence model and the like.

The processor 120 according to an embodiment may train the artificial intelligence model based on the personal training data that reflects a user characteristic and is generated by the personal training data generation model, and the user data corresponding to the actual use data of the user. However, in a case that the artificial intelligence model is trained only by using the personal training data, the training of the artificial intelligence model may be performed while being excessively skewed toward a characteristic of a specific user.

Therefore, the processor 120 may train the artificial intelligence model based on the general training data that reflects a characteristic of a general user and is generated by the general training data generation model, the personal training data, and the user data. In a case that both of the general training data and the personal training data are used, the artificial intelligence model may be trained as a model personalized for the user and the training of the artificial intelligence model is performed without being excessively skewed toward a specific user based on the general training data. Hereinafter, an embodiment in which the artificial intelligence model is trained based on the general training data and the personal training data will be described.

Figure 4:
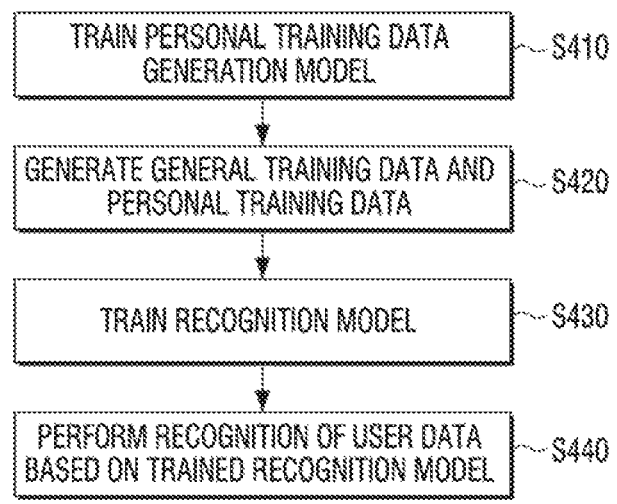
FIG. 4 is a flowchart illustrating a schematic process in which an artificial intelligence model is trained and performs recognition according to an embodiment.

FIG. 4 is a flowchart illustrating a schematic process in which the artificial intelligence model is trained and performs recognition according to an embodiment of the disclosure.

The electronic apparatus 100 may store the general training data generation model, the personal training data generation model, and the artificial intelligence model in the memory 110.

The personal training data generation model may be trained based on user data (operation S410). According to an embodiment, the user data may be data obtained in a training data obtaining mode of the electronic apparatus 100 to obtain actual use data of the user as training data. For example, once the training data obtaining mode is activated, a predetermined text may be displayed on the display and a message for requesting an utterance of the displayed text may be provided. As an example, the processor 120 may control a speaker (not illustrated) to output audio output such as "please read the displayed text aloud," or may control the display to display a user interface (UI) window showing a message "please read the displayed text aloud." Then, a user voice corresponding to the displayed text, such as "how is the weather today?" is input through the microphone (not illustrated) provided in the electronic apparatus 100, and the input voice may be used as the user data to train the personal training data generation model and the artificial intelligence model. Alternatively, handwriting corresponding to a specific text may be input by the user depending on a predetermined message in the training data obtaining mode. The handwriting input as described above may be used as the user data.

However, the disclosure is not limited thereto, and even in case that the training data obtaining mode is not activated, the processor 120 may obtain a user voice through the microphone and use the obtained user voice as the training data. For example, a user voice inquiry, a user voice command, or the like, input during regular use of the electronic apparatus may be obtained in a predetermined period and used as the training data.

As described in more detail below, after personal training data is generated, the personal training data generation model may be trained based on at least one of user voice data or the personal training data. Operation S410 will be described in detail with reference to FIG. 5.

The general training data generation model is pre-trained on the server 200 and then transmitted to the electronic apparatus 100, and thus it might not be necessary to separately train the general training data generation model on the electronic apparatus 100. However, the general training data generation model may be updated on the server 200, and the updated general training data generation model may be periodically transmitted to the electronic apparatus 100 to replace, or update, the existing general training data generation model.

The general training data generation model may generate the general training data that reflects a characteristic of a general user. The personal training data generation model may generate personal training data that reflects a characteristic of the user of the electronic apparatus 100 (operation S420). The personal training data is training data including a characteristic of the user, and may be data used to train the artificial intelligence model to be a personalized model.

According to an embodiment, the artificial intelligence model may be trained and updated based on user data obtained in a predetermined period, the generated general training data, and the generated personal training data (operation S430). However, according to another embodiment, the artificial intelligence model may also be trained based on the user data and the generated personal training data. The artificial intelligence model may be trained and updated based on at least one of the user data, the generated general training data, or the generated personal training data, or any combination thereof.

The user data is actual use data that is unprocessed raw data, unlike the generated general training data and the generated personal training data. Therefore, it is possible to improve recognition accuracy of the artificial intelligence model by using the user data to train the artificial intelligence model, together with the general training data and the personal training data. The user data may be used to train the personal training data generation model and to train the artificial intelligence model as well. Operation S430 will be described in detail with reference to FIG. 6.

Then, recognition of user data may be performed based on the trained (personalized and updated) artificial intelligence model (operation S440). Here, the user data is data to be recognized by the artificial intelligence model, and may be, for example, voice data for voice inquiry. The user data to be recognized by the artificial intelligence may also be used to update the personal training data generation model and the artificial intelligence model.

Specifically, in case that a voice of the user is input to the artificial intelligence model, the artificial intelligence model may recognize the voice of the user, convert the voice of the user into a text, and output the text.

Figure 5:
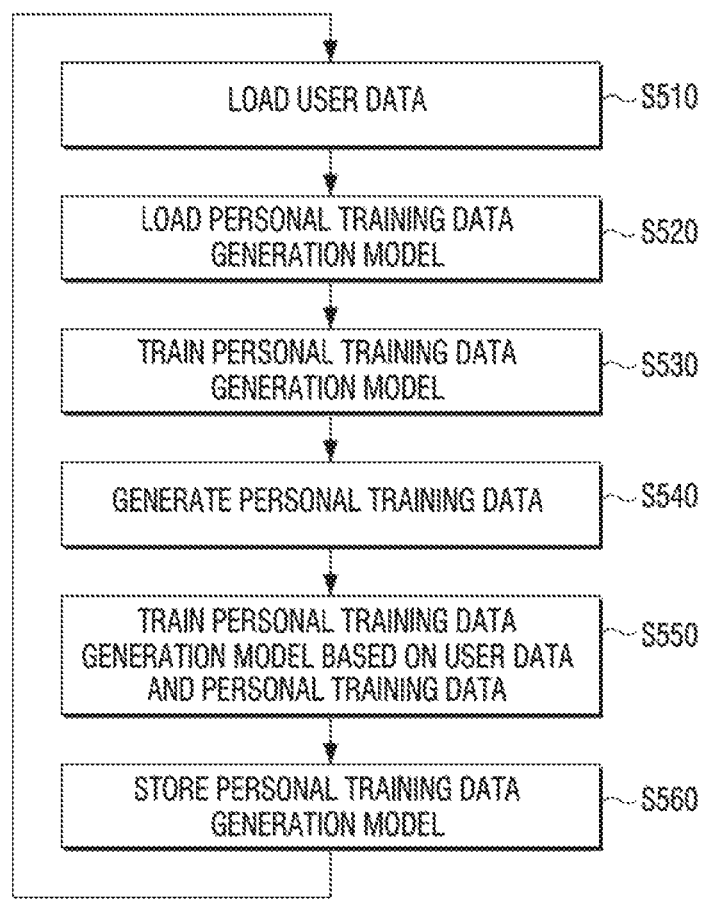
FIG. 5 is a diagram for describing a process in which a personal training data generation model is trained according to an embodiment.

FIG. 5 is a diagram for describing a process in which the personal training data generation model is trained according to an embodiment of the disclosure.

The processor 120 may load user data stored in the memory 110 (operation S510). For example, the processor 120 may load the user data stored in the memory 110 outside the processor 120 to an internal memory (not illustrated) of the processor 120.

Here, the user data may be data input according to a request from the processor 120. For example, in case that the user data is user voice data, the processor 120 may request the user to utter a text including a predetermined word or sentence to obtain the user voice data as training data. As an example, the processor 120 may display a predetermined word or sentence on the display (not illustrated) to guide the user to utter the predetermined word or sentence, or may output a voice through the speaker (not illustrated) to request the user to utter the predetermined word or sentence. The processor 120 may store the user voice data input as described above in the memory 110, and then load the stored user voice data to train the personal training data generation model. Accordingly, the user voice data stored in the memory 110 may be loaded to the processor 120. However, the disclosure is not limited thereto, and in case that the user data are user handwriting data, a character or number handwritten by the user according to the request from the processor 120 may be input to the electronic apparatus 100.

Further, the processor 120 may load the personal training data generation model stored in the memory 110 (operation S520). The order of operations S510 and S520 may be changed.

Then, the personal training data generation model may be trained based on user data (operation S530). Specifically, the personal training data generation model may training using a user data distribution. For example, the personal training data generation model may be updated using a frequency distribution in the user voice data. A frequency distribution in a voice is different for each person. Therefore, in case that the personal training data generation model is trained based on a frequency distribution characteristic, a voice characteristic of the user of the electronic apparatus 100 may be reflected accurately.

Accordingly, the personal training data generation model may be trained to be a model personalized for the user.

Then, the trained personal training data generation model may generate personal training data (operation S540). The personal training data generation model is trained to reflect a characteristic of the user of the electronic apparatus 100, and thus the personal training data generated by the personal training data generation model may be similar to the user data. As an example, the personal training data may be generated as a voice that is very similar to that directly uttered by the user. As another example, the personal training data may be generated as a text having a form that is very similar to that of the text directly written by the user. A similarity between the user data and the personal training data may be determined based on a result of update of the personal training data generation model.

The generated personal training data may be used to train the artificial intelligence model, together with the general training data and the user data (operation S550).

Further, the personal training data generation model may be trained and updated based on the generated personal training data, in addition to the user data.

Then, the processor 120 may store the trained personal training data generation model in the memory 110 (operation S560).

The personal training data generation model may be updated by continuously repeating operations S510 to S560 described above.

Figure 6:
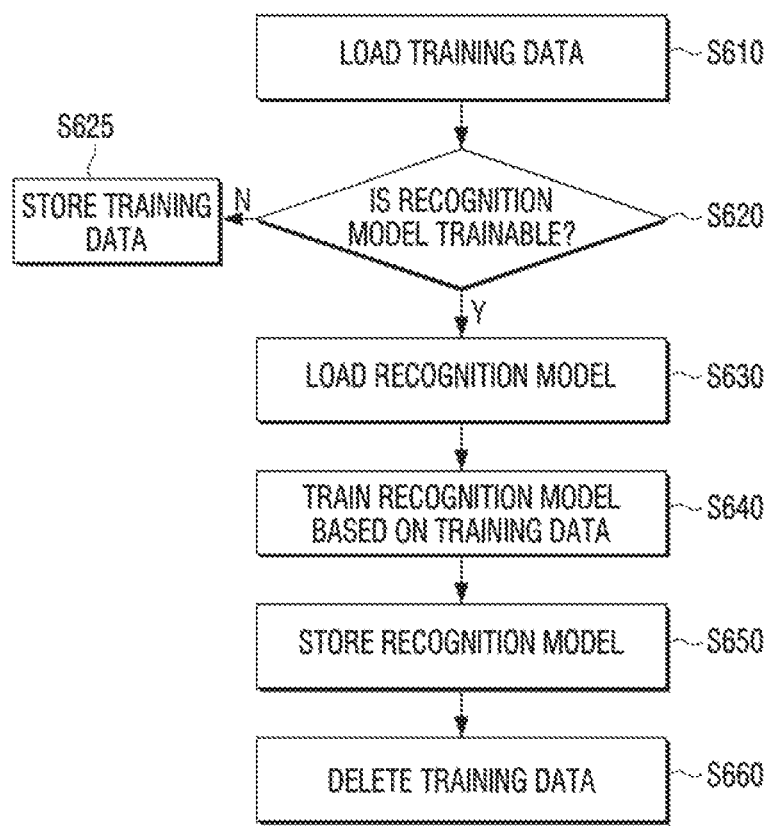
FIG. 6 is a diagram for describing a process in which the artificial intelligence model is trained according to an embodiment.

FIG. 6 is a diagram for describing a process in which the artificial intelligence model is trained according to an embodiment.

The processor 120 may load training data stored in the memory 110 (operation S610). Specifically, the processor 120 may load user data obtained from the user, and general training data and personal training data generated by the training data generation models, respectively.

The processor 120 may identify whether the artificial intelligence model is in a trainable state (operation S620). The processor 120 may identify whether a computing resource necessary for the training of the artificial intelligence model is sufficiently secured. For example, because a large amount of computing resources are used, it may be identified that the artificial intelligence model is in the trainable state, based on the number of operations performed in addition to the operation in which the artificial intelligence model is trained on the electronic apparatus 100 being relatively low.

Specifically, the trainable state of the artificial intelligence model may include the case that the electronic apparatus 100 is in a charge state, the case that a predetermined time occurs, or the case that there is no manipulation by the user for a predetermined of time. Because power is supplied to the electronic apparatus 100 in case that the electronic apparatus 100 is in the charge state, the electronic apparatus 100 may not be turned off during the training of the artificial intelligence model. Further, the predetermined time may be, for example, a time when the user starts to sleep. As an example, in case that the predetermined time is 1 a.m., the artificial intelligence model may be trained based on the training data at 1 a.m. The predetermined time may be obtained by monitoring a pattern of using the electronic apparatus 100, or may be a time set by the user. Further, in case that there is no manipulation by the user for a predetermined time, it is identified that there may hardly be the manipulation of the user even afterward, and thus the artificial intelligence model may be trained. As an example, in case that there is no manipulation of the electronic apparatus 100 by the user for one hour, the artificial intelligence model may be trained.

Further, according to an embodiment, in case that a learning start condition other than the trainable state of the artificial intelligence model is additionally satisfied, the training of the artificial intelligence model may be performed. The learning start condition may include at least one of the case that a command for training the artificial intelligence model is input, the case that a recognition error of the artificial intelligence model occurs a predetermined number of times or more, or the case that a predetermined volume or more of training data is accumulated. For example, in case that the recognition error occurs five times or more within a predetermined time, or in case that 10 MB or more of user voice data is accumulated, the learning start condition may be satisfied.

In a case that it is identified that the artificial intelligence model is not in the trainable state (operation S620—NO), the processor 120 may store the loaded training data (operation S625). For example, the processor 120 may store the loaded user voice data in the memory 110 again.

In a case that it is identified that the artificial intelligence model is in the trainable state (operation S620—YES), the processor 120 may load the artificial intelligence model stored in the memory 110 (operation S630).

The loaded artificial intelligence model may be trained based on the user voice data, the general training data, and the personal training data (operation S640). Specifically, the artificial intelligence model may sequentially be trained using the user voice data, the general training data, and the personal training data.

The processor 120 may store the trained artificial intelligence model in the memory 110 (operation S650).

Then, according to an example, the processor 120 may delete the training data from the memory 110 (operation S660). For example, the processor 120 may delete the user voice data stored in the memory 110. In other words, the user voice data used to train the personal training data generation model and the artificial intelligence model may be deleted.

According to another example, in a case that the volume of data stored in the memory 110 exceeds a predetermined volume, the training data may be sequentially deleted starting from the oldest training data stored in the memory 110.

The order of operations S650 and S660 may be changed.

In the above-described embodiment, the case that personal (general) training data that is generated in advance and stored is used in a case that the learning start condition for the artificial intelligence model is satisfied has been described. However, personal (general) training data may also be generated and used by operating the training data generation module based on the condition being satisfied.

Figure 7:
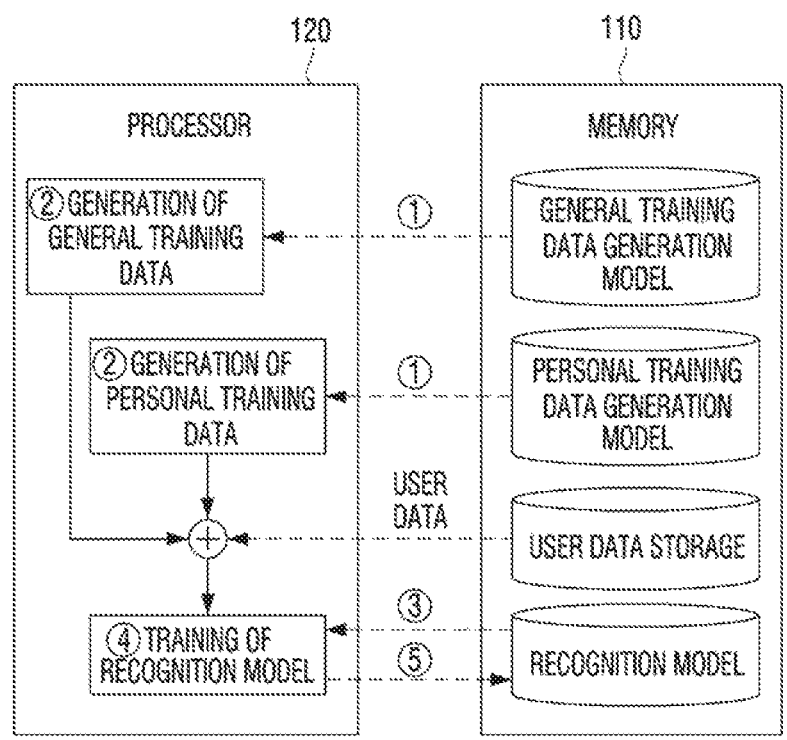
FIG. 7 is a diagram for describing specific operations performed between a processor and a memory according to an embodiment.

FIG. 7 is a diagram for describing specific operations performed between the processor and the memory according to an embodiment.

A detailed description of portions overlapping with those described with reference to FIGS. 4 to 6 will be omitted.

The general training data generation model and the personal training data generation model stored in the memory 110 may be loaded to the processor 120 according to a control of the processor 120 (①).

Then, the general training data generation model and the personal training data generation model loaded to the processor 120 may generate the general training data and the personal training data, respectively (②).

Further, the artificial intelligence model stored in the memory 110 may be loaded to the processor 120 according to the control of the processor 120 (③). For example, the processor 120 may load the artificial intelligence model stored in the memory 110 outside the processor 120 to the internal memory (not illustrated) of the processor 120. Then, the processor 120 may access the artificial intelligence model loaded to the internal memory.

The artificial intelligence model loaded to the processor 120 may be trained based on the user data, the general training data, and the personal training data (④). Here, the user data may be data loaded from the memory 110.

The processor 120 may store the trained artificial intelligence model in the memory 110 (⑤). Further, the processor 120 may upload the trained artificial intelligence model to the server 200.

According to an embodiment, the general training data may include first input data, the personal training data may include second input data, and the artificial intelligence model may perform unsupervised learning based on the user data, the first input data, and the second input data.

For example, it is assumed that the artificial intelligence model is implemented by the voice recognition model. The general training data may include first voice data (first input data), and the personal training data may include second voice data (second input data). In this case, the artificial intelligence model may perform unsupervised learning based on user voice data, the first voice data, and the second voice data.

According to another embodiment, the general training data may include first input data, and the personal training data may include second input data. In this case, the artificial intelligence model may generate first output data corresponding to the first input data based on the first input data being input, and the artificial intelligence model may generate second output data corresponding to the second input data based on the second input data being input. Then, the artificial intelligence model may be trained based on the user data, the first input data, the first output data, the second input data, and the second output data.

For example, it is assumed that the artificial intelligence model is implemented by the voice recognition model. The artificial intelligence model may generate first text data (first output data) corresponding to first voice data (first input data) based on the first voice data being input, and may generate second text data (second output data) corresponding to second voice data (second input data) based on the second voice data being input.

Here, the first text data and the second text data may be generated in a form of probability distribution. For example, in a case that the first voice data include a voice "conference room" or a voice similar thereto, the first text data may be generated as a probability vector (y1, y2, and y3). As an example, y1 may be a probability that a text corresponding to the first voice data is "conference room," y2 may be a probability that a text corresponding to the first voice data is "restroom," and y3 may be a probability that a text corresponding to the first voice data is neither "conference room" nor "restroom."

The artificial intelligence model may also be trained based on the user voice data, the first voice data, and the second voice data, but also the first text data and the second text data generated in a form of probability distribution. Further, the personal training data generation model may also be trained based on the second text data generated by the artificial intelligence model.

According to another embodiment, the artificial intelligence model may be trained based on first input data, first label data corresponding to the first input data, second input data, and second label data corresponding to the second input data. Here, the label data may refer to explicit correct answer data for the input data. For example, in case that the artificial intelligence model is a voice recognition model, the first label data may refer to correct answer text data corresponding to first voice data. As an example, in a case that the user is requested to utter a displayed text, the uttered voice may be user voice data, and the displayed text may be text data corresponding to the user voice data. Alternatively, a text corresponding to a user voice may be displayed on the display (not illustrated) as an output, and the electronic apparatus 100 may receive a feedback for the text from the user. For example, in case that an output text corresponding to a user voice is "nail this to me," and a text received as a feedback from the user is "mail this to me," "mail this to me" may be text data corresponding to the user voice data, as a label.

Similarly, the general training data may include the first voice data and the first label data corresponding to the first voice data.

In other words, the general training data may include the first voice data and the first text data corresponding to the first voice data, and the personal training data may include the second voice data and the second text data corresponding to the second voice data. Hereinafter, for convenience of explanation, in case that the training data is configured as a pair, the general training data is described as a general training data pair, and the personal training data are described as a personal training data pair.

The artificial intelligence model may be trained based on the general training data pair and the personal training data pair each including voice data and text data corresponding to the voice data, and a user voice data pair.

Specifically, the artificial intelligence model may perform supervised learning in which the first voice data is input to the artificial intelligence model and output text data is compared with the first text data. Similarly, the artificial intelligence model may perform supervised learning in which the second voice data is input to the artificial intelligence model and output text data is compared with the second text data.

Although the case that the user data and user voice data has been described, the disclosure is not limited thereto as long as the training data may be configured as a pair. For example, the personal training data may include handwriting data generated similarly to user handwriting, and text data corresponding to the handwriting data. Here, the text data may be data input as a label for the handwriting data.

Figure 8:
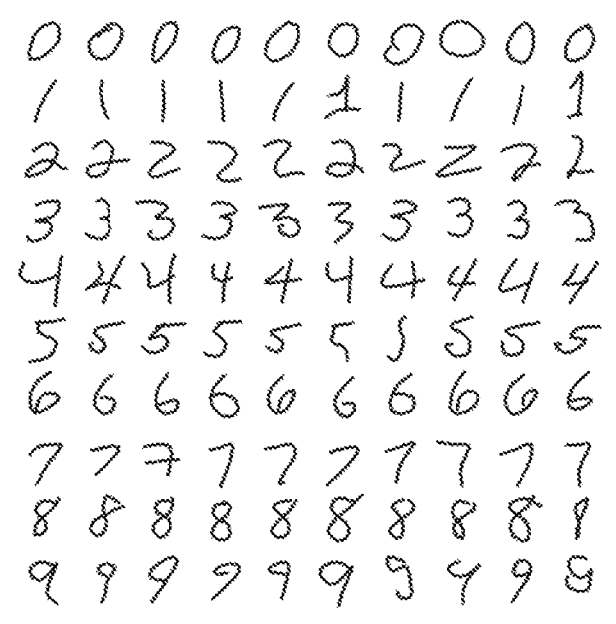

FIG. 8 is a diagram for describing the case that the artificial intelligence model is implemented by an object recognition model according to another embodiment.

FIG. 8 is a diagram illustrating number handwriting. As an example, the handwriting illustrated in FIG. 8 may be handwriting directly written by the user, or handwriting generated by the personal training data generation model. Similar to a voice, the handwriting may be different for each user, and thus in case that the artificial intelligence model is trained to be personalized according to a characteristic of the user, recognition accuracy of the artificial intelligence model may be improved. A process in which the object recognition model is trained is the same as the process illustrated in FIG. 4 described above.

Specifically, the personal training data generation model may be trained based on user handwriting data. Here, the user handwriting data may be data including handwriting input according to a request from the processor 120. For example, the processor 120 may request the user to write numbers from 0 to 9. In this case, number handwriting may be input with a stylus pen to a touch display, or an image including number handwriting written with a pen may be input to the electronic apparatus 100.

Then, the personal training data generation model may be trained based on the user handwriting data. Accordingly, the personal training data generation model may be trained to be a model personalized for the user. The trained general training data generation model and the trained personal training data generation model may generate the general training data and the personal training data, respectively. Here, the general training data may be training data that reflects a handwriting characteristic of a general user, and the personal training data may be training data that reflects a handwriting characteristic of the user of the electronic apparatus 100. The artificial intelligence model may be trained based on the general training data, the personal training data, and the user handwriting data. Accordingly, the trained artificial intelligence model reflects the handwriting characteristic of the user, thereby making it possible to improve user handwriting recognition accuracy.

However, the disclosure is not limited thereto, and the artificial intelligence model may also be trained based on the handwriting data and the personal training data.

Although the case of using the number handwriting has been described in FIG. 8, the embodiment may be applied to a recognition model that recognizes handwriting of characters such as alphabets, and various other object recognition models as well.

Figure 9:
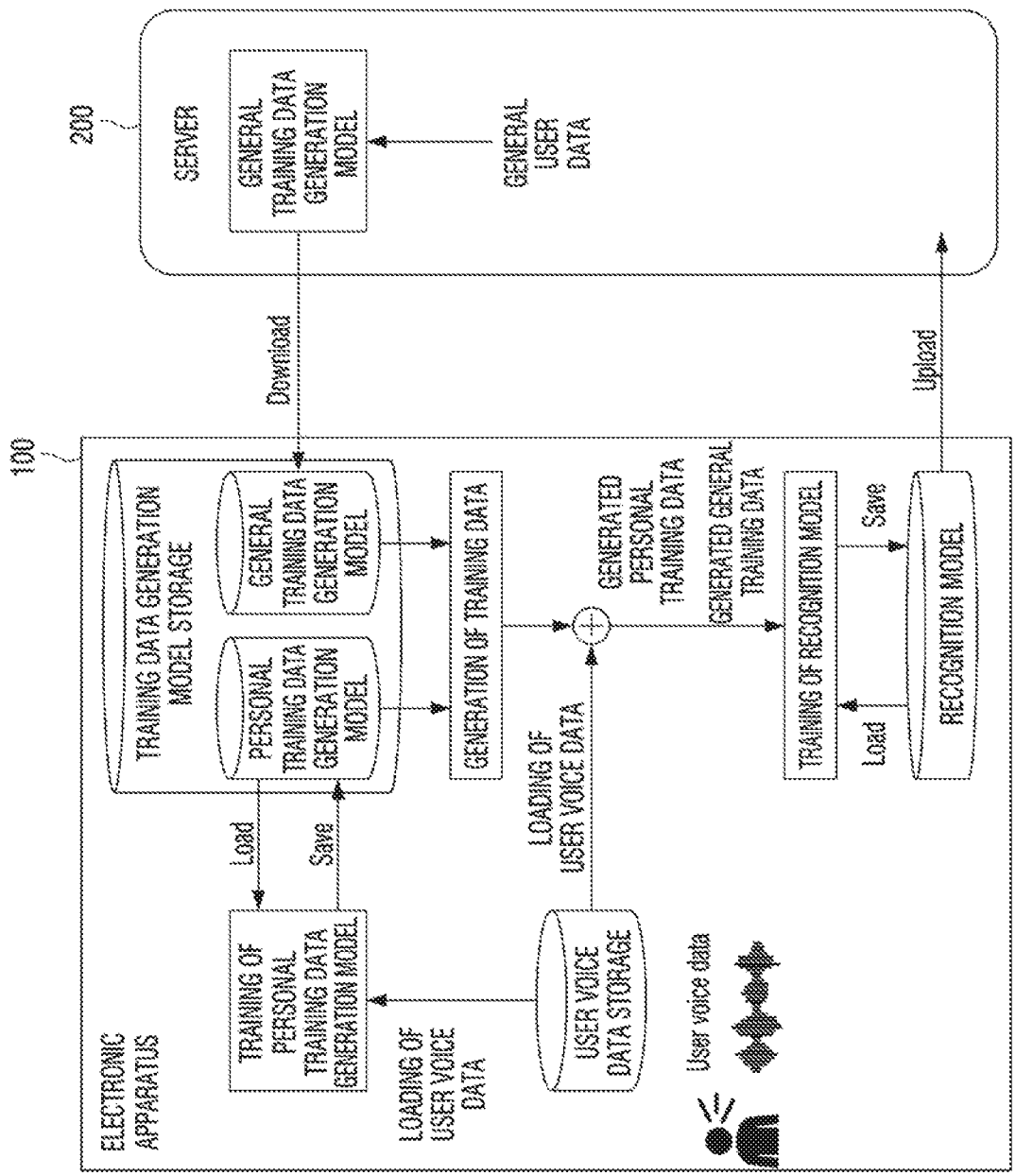
FIG. 9 is a diagram for describing a process in which the artificial intelligence model is trained on the electronic apparatus according to an embodiment.

FIG. 9 is a diagram for describing a process in which the artificial intelligence model is trained on the electronic apparatus according to an embodiment.

A detailed description of portions overlapping with those described with reference to FIGS. 4 to 6 will be omitted.

The personal training data generation model may be trained based on user data stored in a user data storage. The general training data generation model downloaded from the server and the trained personal training data generation model may be stored in a training data generation model storage. Here, the training data generation model storage may be, but is not limited to, a memory that is physically the same as the user data storage, and may be different from the user data storage. The general training data generation model and the personal training data generation model may generate the general training data and the personal training data, respectively. Here, the general training data generation model and the personal training data generation model may each be implemented by a variational autoencoder (VAE), a generative adversarial network (GAN), or the like, but is not limited thereto.

Then, the artificial intelligence model may be updated based on the user data stored in the user data storage, the general training data, and the personal training data.

The updated artificial intelligence model may be uploaded to the server 200 periodically. For example, the artificial intelligence model may be uploaded to the server 200 based on at least one of a predetermined period elapsing or the volume of data learned by the artificial intelligence model being a predetermined volume.

A new (or updated) version of the artificial intelligence model may be transmitted from the server 200 to the electronic apparatus 100. In this case, the existing trained artificial intelligence model may be replaced with (or updated by) the new (or updated) version of the artificial intelligence model transmitted from the server 200. The new (or updated) version of artificial intelligence model may be trained to reflect a personal characteristic of the user, and the new (or updated) version of artificial intelligence model may be relatively rapidly trained based on the personal training data generated by the pre-trained personal training data generation model even in a case that the user data (for example, user voice data stored as a WAV file or MP3 file) is not stored in the memory 110. In other words, because the personal training data generation model is trained based on the user data, an effect similar to that obtained in a case that the artificial intelligence model is trained based on the user data may be obtained even in a case that the artificial intelligence model is trained based on the personal training data generated by the personal training data generation model. Therefore, even in a case that the artificial intelligence model is replaced (or updated) with a new version of the artificial intelligence model, the electronic apparatus 100 may be trained based on the generated personal training data to reflect a personal characteristic without needing to store a vast amount of user data.

The electronic apparatus 100 may further include a communication interface (not illustrated), the display (not illustrated), the microphone (not illustrated), and the speaker (not illustrated), in addition to the memory 110 and the processor 120.

The communication interface includes a circuitry, and may perform communication with the server 200.

The communication interface may include a wireless-fidelity (Wi-Fi) module (not illustrated), a Bluetooth module (not illustrated), an infrared (IR) module, a local area network (LAN) module, an Ethernet module, and the like. Here, each communication module may be implemented in a form of at least one hardware chip. A wireless communication module may include at least one communication chip that performs communication according to various wireless communication protocols such as Zigbee, a universal serial bus (USB), mobile industry processor interface camera serial interface (MIPI CSI), 3rd generation (3G), $3^{rd}$ generation partnership project (3GPP), long term evolution (LTE), LTE-Advanced (LTE-A), 4th generation (4G), and 5th generation (5G), in addition to the above-described communication manners. However, this is only an example, and the communication interface may use at least one of various communication modules. Further, the communication interface may also perform communication with the server in a wired manner.

The communication interface may receive, from the server 200, the general training data generation model, the personal training data generation model, and the artificial intelligence model, through wired or wireless communication. Further, the communication interface may transmit the trained artificial intelligence model to the server 200.

The display may be implemented by a touch screen in which the display and a touch pad configured as a mutual layer structure. Here, the touch screen may be configured to detect a position and area of a touch, and also a pressure of the touch. For example, the display may detect a handwriting input by a stylus pen.

The microphone is a component configured to receive a user voice. The received user voice may be used as the training data or a text corresponding to the user voice may be output depending on the voice recognition model.

The methods according to various embodiments of the disclosure described above may be implemented in a form of an application installable in an existing electronic apparatus.

Further, the methods according to various embodiments of the disclosure described above may be implemented by a software upgrade or a hardware upgrade of the existing electronic apparatus.

Further, various embodiments of the disclosure described above may also be implemented by an embedded server provided in the electronic apparatus, or at least one external server of the electronic apparatus.

According to an embodiment of the disclosure, the various embodiments described above may be implemented by software including instructions stored in a machine-readable storage medium (for example, a non-transitory computer-readable storage medium). The machine is an apparatus that may invoke a stored instruction from a storage medium and may be operated according to the invoked instruction. The machine may include the electronic apparatuses according to the disclosed embodiments. In a case that a command is executed by the processor, the processor may directly perform a function corresponding to the command or other components may perform the function corresponding to the command under a control of the processor. The command may include code created or executed by a compiler or an interpreter. The machine-readable storage medium may be provided in a form of a non-transitory storage medium. Here, the term "non-transitory" means that the storage medium is tangible, and does not distinguish whether data is semi-permanently or temporarily stored on the storage medium. As an example, the "non-transitory storage medium" may include a buffer in which data is temporarily stored.

In addition, according to an embodiment of the disclosure, the methods according to the various embodiments described above may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In a case of the online distribution, at least portions of the computer program product may be at least temporarily stored in a storage medium such as a memory of a server of a manufacturer, a server of an application store, or a relay server or be temporarily created.

In addition, according to an embodiment of the disclosure, the various embodiments described above may be implemented in a computer or a computer-readable recording medium using software, hardware, or a combination of software and hardware. In some cases, embodiments described in the disclosure may be implemented by the processor itself. According to a software implementation, the embodiments such as procedures and functions described in the disclosure may be implemented by separate software modules. Each of the software modules may perform one or more functions and operations described in the disclosure.

Computer instructions for performing processing operations of the machines according to the various embodiment of the disclosure described above may be stored in a non-transitory computer-readable medium. The computer instructions stored in the non-transitory computer-readable medium allow a specific machine to perform the processing operations in the machine according to the various embodiments described above when they are executed by a processor of the specific machine.

The non-transitory computer-readable medium may be a medium that semi-permanently stores data therein and is readable by the machine. A specific example of the non-transitory computer-readable medium may include a compact disk (CD), a digital versatile disk (DVD), a hard disk, a Blu-ray disk, a universal serial bus (USB), a memory card, a ROM, or the like.

In addition, each of components (for example, modules or programs) according to the various embodiments described above may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic apparatus comprising:
   a touch display;
   a microphone;
   a speaker;
   a memory configured to store a plurality of training data generation models and an artificial intelligence model, wherein the plurality of training data generation models comprises a personal training data generation model trained based on personal use data to generate personal training data that reflects characteristics of a user, and a general training data generation model trained to generate general training data corresponding to general use data of a plurality of users; and
   a processor configured to:
      control the touch display or the speaker to provide guide information requesting the personal use data;
      obtain the personal use data through the touch display or the microphone;
      generate the personal training data that reflects a characteristic of the user using the personal use data and the personal training data generation model;
      generate the general training data that reflects a characteristic of the plurality of users;
      identify whether a learning start condition is satisfied based on the artificial intelligence model incorrectly recognizing input data received through the touch display or the microphone a predetermined number of times;
      train the artificial intelligence model using the personal training data and the general training data as training data, based on the learning start condition being satisfied;
      store the artificial intelligence model trained using the personal training data and the general training data in the memory; and
      perform recognition of input data received through the touch display or the microphone using the artificial intelligence model trained using the personal training data and the general training data in the memory.

2. The electronic apparatus as claimed in claim 1, wherein the processor is further configured to update the artificial intelligence model based on at least one of the personal training data, the general training data, or the personal use data.

3. The electronic apparatus as claimed in claim 2, wherein the processor is further configured to update the personal training data generation model based on at least one of the personal use data or the personal training data.

4. The electronic apparatus as claimed in claim 1, wherein the artificial intelligence model is a voice recognition model, a handwriting recognition model, an object recognition model, a speaker recognition model, a word recommendation model, or a translation model.

5. The electronic apparatus as claimed in claim 2, wherein the general training data includes first input data,
   the personal training data includes second input data, and
   the artificial intelligence model performs unsupervised learning based on the personal use data, the first input data, and the second input data.

6. The electronic apparatus as claimed in claim 2, wherein the general training data includes first input data, the personal training data includes second input data, and
the artificial intelligence model generates first output data corresponding to the first input data based on the first input data being input, generates second output data corresponding to the second input data based on the second input data being input, and is trained based on the personal use data, the first input data, the first output data, the second input data, and the second output data.

7. The electronic apparatus as claimed in claim 1, wherein the general training data generation model is downloaded from a server and stored in the memory.

8. The electronic apparatus as claimed in claim 7, wherein the processor is configured to upload the artificial intelligence model to the server.

9. The electronic apparatus as claimed in claim 1, wherein the processor is configured to train the artificial intelligence model based on the electronic apparatus being in a charge state, an occurrence of a predetermined time, or detecting no manipulation of the electronic apparatus by the user for a predetermined time.

10. A control method of an electronic apparatus including a touch display, a microphone, and speaker, a plurality of training data generation models and an artificial intelligence model, wherein the plurality of training data generation models includes a personal training data generation model trained based on personal use data to generate personal training data that reflects characteristics of a user and a general training data generation model trained to generate general training data corresponding to general use data of a plurality of users, the control method comprising:
   controlling the touch display or the speaker to provide guide information requesting the personal use data;
   obtaining the personal use data through the touch display or the microphone;
   generating the personal training data that reflects a characteristic of the user using the personal use data and the personal training data generation model;
   generating the general training data that reflects a characteristic of the plurality of users;
   identifying whether a learning start condition is satisfied based on dthe artificial intelligence model incorrectly recognizing input data received through the touch display or the microphone a predetermined number of times;
   training the artificial intelligence model using the personal training data and the general training data as training data, based on the learning start condition being satisfied;
   storing the artificial intelligence model trained using the personal training data and the general training data; and
   performing recognition of input data received through the touch display or the microphone using the artificial intelligence model trained using the personal training data and the general training data.

11. The control method as claimed in claim 10, wherein the artificial intelligence model is a model that is updated based on at least one of the personal training data, the general training data, or the personal use data.

12. The control method as claimed in claim 11, wherein the personal training data generation model is updated based on at least one of the personal use data or the personal training data.

13. The control method as claimed in claim 10, wherein the artificial intelligence model is a voice recognition model, a handwriting recognition model, an object recognition model, a speaker recognition model, a word recommendation model, or a translation model.

14. The control method as claimed in claim 11, wherein the general training data includes first input data,
the personal training data includes second input data, and the artificial intelligence model performs unsupervised learning based on the personal use data, the first input data, and the second input data.

15. The control method as claimed in claim 11, wherein the general training data includes first input data,
the personal training data include second input data, and
the artificial intelligence model generates first output data corresponding to the first input data based on the first input data being input, generates second output data corresponding to the second input data based on the second input data being input, and is trained based on the personal use data, the first input data, the first output data, the second input data, and the second output data.

16. The control method as claimed in claim 10, wherein the general training data generation model is downloaded from a server and stored in a memory of the electronic apparatus.

17. The control method as claimed in claim 16, wherein the artificial intelligence model is uploaded to the server.

18. The control method as claimed in claim 10, further comprising training the artificial intelligence model based on the electronic apparatus being in a charge state, an occurrence of a predetermined time, or detecting no manipulation of the electronic apparatus by the user for a predetermined time.

19. A non-transitory computer-readable medium configured to store a program for performing a method for personalization of an artificial intelligence model in an electronic apparatus using a plurality of training data generation models, wherein the plurality of training data generation models includes a personal training data generation model trained based on personal use data to generate personal training data that reflects characteristics of a user and a general training data generation model trained to generate general training data corresponding to general use data of a plurality of users, the method including:
   controlling a touch display or a speaker to provide guide information requesting the personal use data;
   obtaining the personal use data through the touch display or a microphone;
   generating the personal training data that reflects a characteristic of the user using the personal use data and the personal training data generation model;
   generating the general training data that reflects a characteristic of the plurality of users;
   identifying whether a learning start condition is satisfied based on the artificial intelligence model incorrectly recognizing input data received through the touch display or the microphone a predetermined number of times;
   training the artificial intelligence model using the personal training data and the general training data as training data, based on the learning start condition being satisfied; and
   performing recognition of input data received through the touch display or the microphone using the artificial intelligence model trained using the personal training data and the general training data.

20. The non-transitory computer-readable medium as claimed in claim 19, wherein the method further includes training the artificial intelligence model using at least one of the personal training data, the general training data, or actual use data of the user.

* * * * *